United States Patent [19]
Phillips

[11] Patent Number: 4,512,364
[45] Date of Patent: Apr. 23, 1985

[54] NON-STICK GLASS STOPCOCK

[76] Inventor: Edwin Phillips, 700 Cedar Ave., P.O. Box 67, Middlesex, N.J. 08846

[21] Appl. No.: 462,068

[22] Filed: Jan. 28, 1983

[51] Int. Cl.³ .............................................. F16L 7/00
[52] U.S. Cl. .................................... 137/375; 251/309; 403/383
[58] Field of Search ............................ 137/375, 454.5; 251/309, 368, 317; 403/383

[56] References Cited

U.S. PATENT DOCUMENTS

| | | | |
|---|---|---|---|
| 1,538,346 | 5/1925 | Mueller | 251/317 |
| 1,829,365 | 10/1931 | Meyer | 403/383 |
| 3,589,677 | 6/1971 | Segers | 137/375 |
| 3,782,686 | 1/1974 | Cowie | 251/309 |
| 4,285,498 | 8/1981 | Nightingale | 251/368 |
| 4,410,003 | 10/1983 | Sandling | 137/375 |

Primary Examiner—Martin P. Schwadron
Assistant Examiner—Sheri Novack
Attorney, Agent, or Firm—Shoemaker and Mattare, Ltd.

[57] ABSTRACT

A non-stick glass stopcock includes a sleeve interposed between a stem tapered body and a tapered valve seat. The sleeve permits operation of the stopcock while eliminating the need for any grease to be located between the stem and valve seat tapered portions. The adjustment mechanism maintains adjustment when the stopcock moves between open and closed positions.

8 Claims, 3 Drawing Figures

NON-STICK GLASS STOPCOCK

BACKGROUND OF THE INVENTION

The present invention relates, in general, to valves, and, more particularly, to stopcock valve assemblies.

Presently known glass stopcocks are designed in a manner which presents many problems. For example, the stem of such known stopcocks is precision ground to match a precision ground surface in the main body. When the two parts are engaged, grease is required on the engaging surfaces to reduce friction. The grease causes contamination problems. Furthermore, the grease oxidizes so that, in time, the stopcock cannot be rotated.

SUMMARY OF THE INVENTION

The device embodying the teachings of the present invention includes a thin sleeve made of material having a low co-efficient of friction, such as Teflon or the like. The sleeve is placed between the stem and a valve body. The surface of the stem is coarse ground to a certain roughness, the Teflon sleeve is then forced onto the tapered stopcock stem so that the sleeve material is stretched tightly, and then holes are defined in the sleeve to be aligned with bores defined through the stem. The sleeve stays in position and does not move when the stopcock is in use.

In order to take advantage of all the characteristics of the addition of the sleeve, an adjustment mechanism is included. The locking mechanism includes a threaded portion located on the bottom of the stem, a locknut on that threaded portion and a washer interposed between the locknut and the valve body. The adjustment mechanism permits adjustments of sealing pressure as conditions in vacuum, high vacuum, pressure, high pressure, and high and low temperature require.

The sleeve is preferably Teflon, or any other such material which has a low co-efficient of friction, is resistant to low and high temperatures, and has a high resistance to corrosion.

The adjustment mechanism includes a washer which is designed to be keyed to the valve stem. The washer is preferably plastic, and prevents the locknut from rotating and thereby changing the adjustment of the valve assembly as the stem is rotated from open to closed positions.

OBJECTS OF THE INVENTION

The main object of the present invention is to provide a glass stopcock which does not require grease.

Another object of the present invention is to provide a glass stopcock in which a set adjustment is maintained during movement of the stopcock between open and closed positions.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 2:
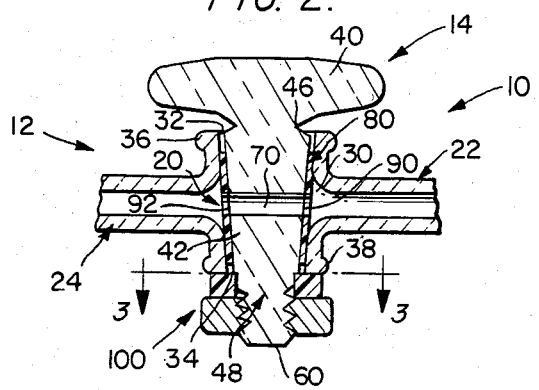
FIG. 2 is an exploded view showing the various component parts of the assembly embodying the teachings of the present invention.
Figure 1:
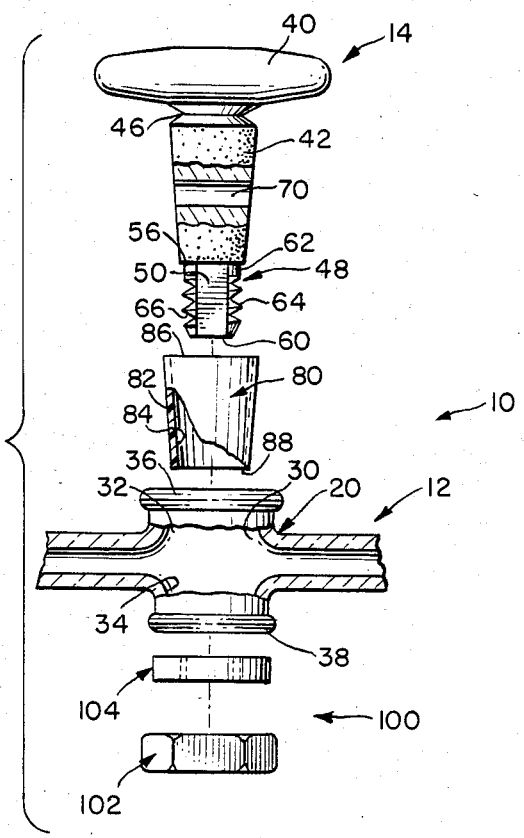
FIG. 1 is an elevation view showing the device of the present invention in an assembled configuration.

Shown in FIGS. 1 and 2 is a valve stopcock assembly 10 which includes a body portion 12 and a rotatable stem portion 14. Preferably, the assembly 10 is glass. The body includes a seating section 20 and a plurality of aligned fluid conduit portions 22 and 24. The stem rotates to establish and prevent fluid communication between selected ones of the fluid conduits. Preferably, the body includes a pair of such conduits, but other configurations can be used without departing from the scope of the present invention. The seating portion further includes a tapered bore 30 which is tapered from first end 32 to second end 34. Flared rims 36 and 38 can be included on the ends, if desired. The bore intersects the conduit portions.

The stem portion 14 is unitary and includes a handle 40 and a tapered stem body 42 integrally joined to the handle by a neck 46. The stem body is tapered to match the taper of the body portion 12. The stem body includes a distal portion 48 which has a pair of planar flats such as flat 50 and flat 52 (see FIG. 3) defined thereon to extend from end 56 of the stem body to distal portion end 60. A trunk section 62 is defined adjacent to the end 56 and screw threads 64 and 66 are defined on the distal portion for a purpose which will be evident from the ensuing disclosure.

A bore 70 is defined transversely through the stem body so that conduits 22 and 24 can be fluidly connected together via the bore 70 when the valve is assembled.

A sleeve 80 is snugly fit about the tapered stem body. The sleeve is tapered, and, as shown in FIG. 2, is unitary and has an unbroken, uninterrupted body 82 having bore 84 defined longitudinally therethrough. A first end 86 has a diameter greater than the diameter of a second end 88.

The physical dimensions of the stem are selected so that the stem body and the sleeve can be accommodated in the valve tapered seating section 20 so that when the stem and the sleeve are assembled, the dimension of the assembly meets the dimensional standards. The stem assembly is interchangeable with housings presently located in the field. Preferably, the sleeve is made from a material with a very low co-efficient of friction, is highly resistant to corrosive materials, and which can withstand high temperatures (e.g., 450° F. or the like). An example of such a material is Teflon.

Once the sleeve 80 is snugly located on the stem tapered body, a plurality of holes, such as aligned holes 90 and 92, are defined in that sleeve to be aligned with the ends of the bore or bores defined through the stem body, in this case bore 70.

The holes 90 and 92 are punched in the sleeve after the sleeve is positioned on the stem body. To emphasize this feature, the sleeve is shown in FIG. 1 as having an uninterrupted body, whereas the holes are shown in FIG. 2.

It has been found that when the tapered surface of the stem is ground to a certain surface roughness and the sleeve is pressed onto the taper so that the material is stretched slightly and then the hole is cut into the sleeve to match the hole in the stem, the sleeve, after it is assembled onto the body, does not move and produces a positive sealing surface without requiring the addition of any lubricant.

An adjustment assembly 100 is attached to the stem distal portion and permits adjustments to be made to accommodate expansion and contraction, insure positive sealing force under high pressure application, and to allow for other dimensional changes, as well as to permit positive sealing under high vacuum applications.

The adjustment assembly 100 includes screw threads 64 and 66 and the flats 50 and 52 are on the stem distal portion. A nut 102 is threadably coupled to the stem distal end by threads 64 and 66, and a washer 104 is positioned on the distal end to be interposed between the locknut 102 and rim 38. Preferably, the washer is formed of a plastic-type material.

Figure 3:
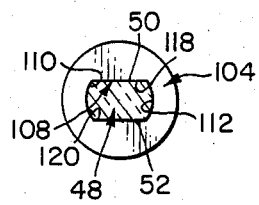
FIG. 3 is a view taken along line 3—3 of FIG. 2.

As best shown in FIG. 3, the washer has a polygonal opening 108 which is shaped to include a pair of arcuate ends 110 and 112 to accommodate arcuate threaded portions 64 and 66 on the stem distal end portion and to include planar portions 118 and 120 to accommodate the planar flats 50 and 52.

If the nut 102 were to be placed directly onto the stem distal end, the face of the nut would engage rim 38 of the body and friction between the body and the nut would tighten or loosen the nut, depending upon the direction of stem rotation.

The washer 104 prevents such tightening-loosening action. With the washer interposed between the rim 38 and the locknut 102, the nut 102 will rotate with the stem as that stem is rotated in either direction. Washer planar portions 118 and 120 each acts as a key mechanism to lock the washer to the stem so that the washer rotates in the same direction as the stem. This prevents any frictional force from being applied to the nut and thus the nut will not be loosened or tightened due to rotation of the stem.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A valve assembly comprising:
    a body portion which includes a plurality of conduits and a tapered bore intersecting each of said conduits;
    a glass stem portion rotatably mounted in said body tapered bore, said stem portion having a stem body tapered to fit into said body portion tapered bore, a handle on one end of said stem portion body, a bore defined through said stem portion body, and a distal end section with said stem portion;
    a tapered sleeve snugly fit about said stem portion body to be interposed between said stem portion body and said body portion tapered bore;
    means for providing non-slip contact between said sleeve and said stem portion body;
    adjustment means on said stem distal end portion, said adjustment means including a screw thread on said distal end portion, a lock nut threadably attached to said distal end portion and a washer interposed between said lock nut and said body portion;
    said means for providing non-slip contact between said sleeve and said stem portion body including the outer surface of the tapered body being coarse ground roughened prior to the installation of said tapered sleeve.

2. The valve assembly defined in claim 1 wherein said sleeve is formed of plastic type material.

3. The valve assembly defined in claim 2 wherein said plastic material type material is Teflon.

4. A valve assembly comprising:
    a body portion which includes at least two conduits and a tapered bore intersecting said conduits;
    an integral glass stem portion rotatably mounted in said body tapered bore, said stem portion having a stem body with a surface which is tapered to fit into and complement said body portion tapered bore, a handle on one end of said stem portion body, a bore defined through said stem portion body, and a distal end section with said stem portion body;
    a tapered sleeve;
    means for providing non-slip contact between and for snugly fitting said tapered sleeve about said stem portion body so as to be interposed between said stem portion body and said body portion tapered bore to provide a non-stick surface therebetween;
    adjustment means on said stem distal end portion;
    said means for providing non-slip contact between said sleeve and said stem portion body including the outer surface of the tapered body being coarse ground roughened prior to the installation of said tapered sleeve.

5. The valve assembly defined in claim 4 wherein said sleeve is formed of plastic material.

6. The valve assembly defined in claim 5 wherein said plastic material is Teflon.

7. The valve assembly defined in claim 6 wherein said adjustment means includes a screw thread on said distal end portion of said glass stem portion, a lock nut threadably attached to said threaded end portion, and a washer interposed between said lock nut and said body portion.

8. The valve assembly defined in claim 4 wherein said adjustment means includes a screw thread on said distal end portion of said glass stem portion, a lock nut threadably attached to said threaded end portion, and a washer interposed between said lock nut and said body portion.

* * * * *